(12) United States Patent
Matteucci et al.

(10) Patent No.: US 11,247,599 B2
(45) Date of Patent: Feb. 15, 2022

(54) CUP HOLDER INSERT AND METHODS FOR INCREASING DEPTH OF CUP HOLDERS

(71) Applicant: Deer Solutions LLC, Milwaukee, WI (US)

(72) Inventors: Ronnie I Matteucci, Dousman, WI (US); Patrick Joseph McDonough, Whitefish Bay, WI (US)

(73) Assignee: Deer Solutions LLC, Milwaukee, WI (US)

( * ) Notice: Subject to any disclaimer, the term of this patent is extended or adjusted under 35 U.S.C. 154(b) by 185 days.

(21) Appl. No.: 16/596,168

(22) Filed: Oct. 8, 2019

(65) Prior Publication Data

US 2021/0101514 A1 Apr. 8, 2021

(51) Int. Cl.
*F16M 11/00* (2006.01)
*B60N 3/10* (2006.01)

(52) U.S. Cl.
CPC .............. *B60N 3/105* (2013.01); *B60N 3/103* (2013.01)

(58) Field of Classification Search
CPC .......... B60N 1/103; B60N 3/10; B60N 3/101; B60N 3/106; B16N 3/105
See application file for complete search history.

(56) References Cited

U.S. PATENT DOCUMENTS

| 5,285,953 | A | * | 2/1994 | Smith | B60N 3/103 220/737 |
| 5,533,782 | A | * | 7/1996 | Goldman | A47C 7/62 297/188.18 |
| 5,939,711 | A | * | 8/1999 | Crawford | G01R 1/071 250/227.17 |
| 10,875,438 | B2 | * | 12/2020 | Hopfen | B60N 3/108 |
| 2010/0090079 | A1 | * | 4/2010 | Choi | B60N 3/106 248/311.2 |

* cited by examiner

*Primary Examiner* — Amy J. Sterling
(74) *Attorney, Agent, or Firm* — Andrus Intellectual Property Law, LLP

(57) ABSTRACT

A cup holder insert for increasing the depth of an existing cup holder includes a generally cylindrical body with an open top, a bottom and a sidewall. The body also includes an upper lip extending outwardly from the sidewall and surrounding the top. An engagement system having a flexible lip, an engagement aperture and an alignment flange functions to secure the cup holder insert into an existing cup holder to increase the existing cup holder depth. A method for inserting the cup holder insert into an existing cup holder is also disclosed.

9 Claims, 3 Drawing Sheets

CUP HOLDER INSERT AND METHODS FOR INCREASING DEPTH OF CUP HOLDERS

FIELD

The present application relates to cup holders for retaining cups therein, and more particularly to cup holder inserts for increasing the depth of existing cup holders.

BACKGROUND AND SUMMARY

This Background and Summary is provided to introduce a selection of concepts that are further described below in the Detailed Description. This Background and Summary is not intended to identify key or essential features of the claimed subject matter, nor is it intended to be used as an aid in limiting the scope of the claimed subject matter.

In sports and entertainment facilities, the first several rows on the seating area may be expandable/retractable seating. For example, in certain National Basketball Association (NBA) facilities, approximately 2,500 to 3,500 seats are retractable so that the facility can increase the size of the floor area in one instance when the seats are retracted, but have seating as close to the floor area as possible in other instances when the seats are expanded. In the first instance when the seats are retracted, the flooring area has a greater square footage; and in contrast, in the second instance where the seats are fully expanded, the flooring area has a smaller square footage. The ability to create greater square footage by retracting the seats in advantageous as it may create more floor space for example a hockey rink, a music stage, or other events.

Many facilities place cup holders on arm rests of seats for convenience to the spectator. In retractable seats, however, the cup holders must be very shallow so that the cup holders are not damaged when the seats are retracted and so that the seats may effectively retract to create sufficient floor space. Moreover, to facilitate the retraction and expansion of the seats, cup holders are often integral with the arm rests of the seats. The shallow nature of the cup holders provides for an uncomfortable experience for the spectator because the cup holders cannot effectively hold cups, especially of a larger size.

The present application contemplates a cup holder insert to be inserted within existing cup holders on the seat arm rest of sport and entertainment facilities, or other facilities that have retractable seats with cup holders on the arm rests. The cup holder insert interacts with the existing cup holder, creating a deeper cup holder and the ability to hold larger cups and therefore a larger volume of beverages. The cup holder sleeve may be removable so that it may be removed prior to the retraction of the seats to facilitate efficient storage of the seats when in retracted mode.

The cup holder insert enhances the experience of the spectator because it solves the problem of using a shallow and ineffective cup holder necessary for the retractable seats. Since the cup holder insert may be temporarily inserted and removed, the seats may be retracted without other modifications. In addition, cup holder insert may include a retention device to prevent it from sliding out unintentionally during use. Accordingly, the insert; remove functionality does not disrupt, impede, or otherwise disturb the retraction of the retractable seating.

The present application therefore contemplates a cup holder insert for increasing the depth of an existing cup holder on an arm rest. The cup holder insert has a generally cylindrical body, with an open top, a bottom for supporting a cup, and a side wall. The bottom may include at least one aperture through the bottom to permit drainage, but the shape and design of the aperture may take any form. The bottom is spaced from and located below the open top and is located in a first cup supporting plane that is generally parallel with a surface that supports a seat having the arm rest and existing cup holder. The side wall has an inner surface and an outer surface and extends upwardly from the bottom. The side wall has a diameter that tapers outwardly from the bottom to the open top. An upper lip extends outwardly from the side wall and substantially surrounds the open top at a terminal upper end where the upper lip meets the open top. The upper lip has an outer upper lip diameter that is greater than the side wall diameter. The outer upper hp diameter tapers outwardly from the terminal upper end to a support surface. The support surface is in a substantially parallel plane to the bottom.

The cup holder insert of the present application may further include an engagement system integrated with the body of the cup holder insert. The engagement system may include a flexible lip having a width and a length. The flexible lip extends upwardly and outwardly from the body at a location where the side wall meets the bottom. The length of the flexible lip terminates in an engagement surface for engaging an existing cup holder. An engagement aperture extends through the body and the upper lip at a location above the flexible lip to the open top. The engagement aperture may have a width that is commensurate with the width of the flexible lip to permit the flexible lip to move inwardly. An alignment flange is integral with the upper lip and extends outwardly therefrom. The alignment flange is spaced above and may be vertically aligned with the flexible lip and the engagement aperture. The alignment flange generally spans the engagement aperture along the upper lip, and may include a recess for alignment for the arm rest.

In other embodiments, a cup holder insert for increasing the depth of an existing cup holder is disclosed where the cup holder insert has a generally cylindrical body with an open top, a bottom for supporting a cup located below the open top and located in a first plane, and a side wall extending upwardly from the bottom and having a side wall diameter. The generally cylindrical body of the cup holder insert may include an upper lip extending outwardly from the side wall and substantially surrounding the open top. The upper lip may have an outer upper lip diameter that is greater than the side wall diameter. The upper lip may have a diameter that tapers outwardly from a terminal upper end to a support surface, the support surface being in a substantially parallel plane as the bottom of the cup holder insert.

The cup holder insert may also include a flexible lip extending upwardly and outwardly from the body and having an engagement surface being in a substantially parallel plane to the bottom. The cup holder insert may further include an engagement aperture extending through the body above the flexible lip. The cup holder insert may also include an alignment flange integral with the upper lip and extending outwardly therefrom. The side wall diameter may taper outwardly from the bottom toward the open top. The bottom may have at least one aperture through the bottom. Certain embodiments come with an engagement aperture having a width commensurate with the width with flexible lip such that the engagement aperture permits the flexible lip to move inwardly. The engagement aperture may extend through the outer upper lip, as well as the body. In certain embodiments, the alignment flange may span the engagement aperture along the upper lip. Moreover, the alignment flange may include a recess for alignment with an arm rest carrying an existing cup holder.

The present application also contemplates a method for increasing the depth of an existing cup holder in an arm rest. The method first includes a step of obtaining an arm rest having an existing cup holder. The existing cup holder may have an open bottom, an open top, a generally cylindrical side wall extending from the bottom to the top and defining an existing cup holder depth. The generally cylindrical side wall in the existing cup holder has an inner surface, an outer surface and a top end defining the open top. The side wall with the existing cup holder also has a bottom end terminating in the open bottom, and the inner surface of the side wall defines an existing cup holder diameter.

The method next contemplates obtaining a cup holder insert for increasing the depth of an existing cup holder. The cup holder insert has a generally cylindrical body with an open top, an insert bottom for supporting a cup, the insert bottom being spaced from and located below the open top, and the insert bottom is located in a first plane. An insert side wall having an outer surface and an inner surface is present, the insert side wall extends upwardly from the insert bottom defining a cup holder insert depth. The cup holder insert depth is greater than the existing cup holder depth. The insert side wall tapers outwardly from the top to the bottom. The insert side wall diameter is less than the existing cup holder diameter at and near the bottom end, and the insert side wall diameter is greater than the existing cup holder diameter at the top end.

The method contemplates placing the cup holder in the existing cup holder such that the outer surface of the cup holder insert sidewall engages the inner surface of the existing cup holder diameter at a location above the existing cup holder insert bottom and below the existing cup holder insert top. In certain embodiments, the method is further comprised of a step of removing the bottom surface of the existing cup holder to create an open bottom in the existing cup holder. In other embodiments, the method contemplates an additional step of removing the cup holder insert from the existing cup holder, for example when the seats having the existing cup holder are to be retracted.

The method of the present application completes an embodiment wherein the cup holder insert body includes an upper lip extending outwardly from the insert side wall and substantially surrounding the open top of the cup holder insert. The upper lip has an outer lip diameter that is greater than the insert side wall diameter. The upper lip diameter may taper outwardly from the terminal upper end where the upper lip meets the cup insert open top to a support surface. The support surface is in a substantially parallel plane to the cup insert bottom. In this embodiment, the step of placing the cup holder insert in the existing cup holder further includes engaging the support surface of the cup holder insert with the open top of the existing cup holder. In another embodiment, the generally cylindrical side walls of the existing cup holder taper inwardly from the open top to the bottom end.

In another embodiment, the method contemplates the cup holder insert body including a flexible lip extending upwardly and outwardly from the body at the bottom and terminating in an engagement surface being in a substantially parallel plane to the bottom of the cup holder insert. In this embodiment in step of placing the cup holder insert in the existing cup holder further includes engaging the engagement surface of the cup holder insert with the bottom end of the side wall of the existing cup holder. In a variation of this embodiment, the cup holder insert body further includes an engagement aperture extending through the cup holder insert body at a location above the flexible lip and extending upwardly to the open top. In this embodiment, the step of placing the cup holder insert in the existing cup holder further includes moving the flexible lip through the existing cup holder so that the flexible lip flexes resiliently inwardly as the cup holder insert moves along the existing cup holder diameter and returns to an original position when it moves completely through. In this instance the engagement surface of the cup holder insert engages with the bottom end of the side wall of the existing cup holder once it moves through the existing cup holder diameter.

Other embodiments of the method contemplate that the cup holder insert body include the flexible hp extending upwardly from the body from the bottom of the cup holder insert and terminating in an engagement surface located in a substantially parallel plane to the bottom of the cup holder insert, along with an engagement aperture extending through the cup holder insert body and upper lip at a location above the flexible lip to the open top. In this embodiment, the step of placing the cup holder insert in the existing cup holder includes moving the flexible lip through the existing cup holder such that the flexible lip flexes resiliently inwardly into the engagement aperture as the cup holder moves along the existing cup holder diameter. The flexible lip then returns to its original position once it moves completely through the existing cup holder diameter so that the engagement surface of the cup holder insert engages with the bottom end of the side wall of the existing cup holder.

In certain embodiments, the method contemplates that the cup holder insert include an alignment flange integrated with the upper lip and extending outwardly there from. The alignment flange may be spaced above and vertically aligned with the flexible hp and the engagement aperture. The alignment flange may span the engagement aperture along the upper lip and include a recess for alignment with the arm rest. In this embodiment, the alignment flange may include a recess for engagement with the arm rest. In certain embodiments the arm rest have any existing cup holder integral with the arm rest located at the terminal end of the arm rest. All embodiments enhance the experience for the spectator by solving the problem of using a shallow and ineffective cup holder.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different methods and assemblies described herein may be used alone.

Figure 1:
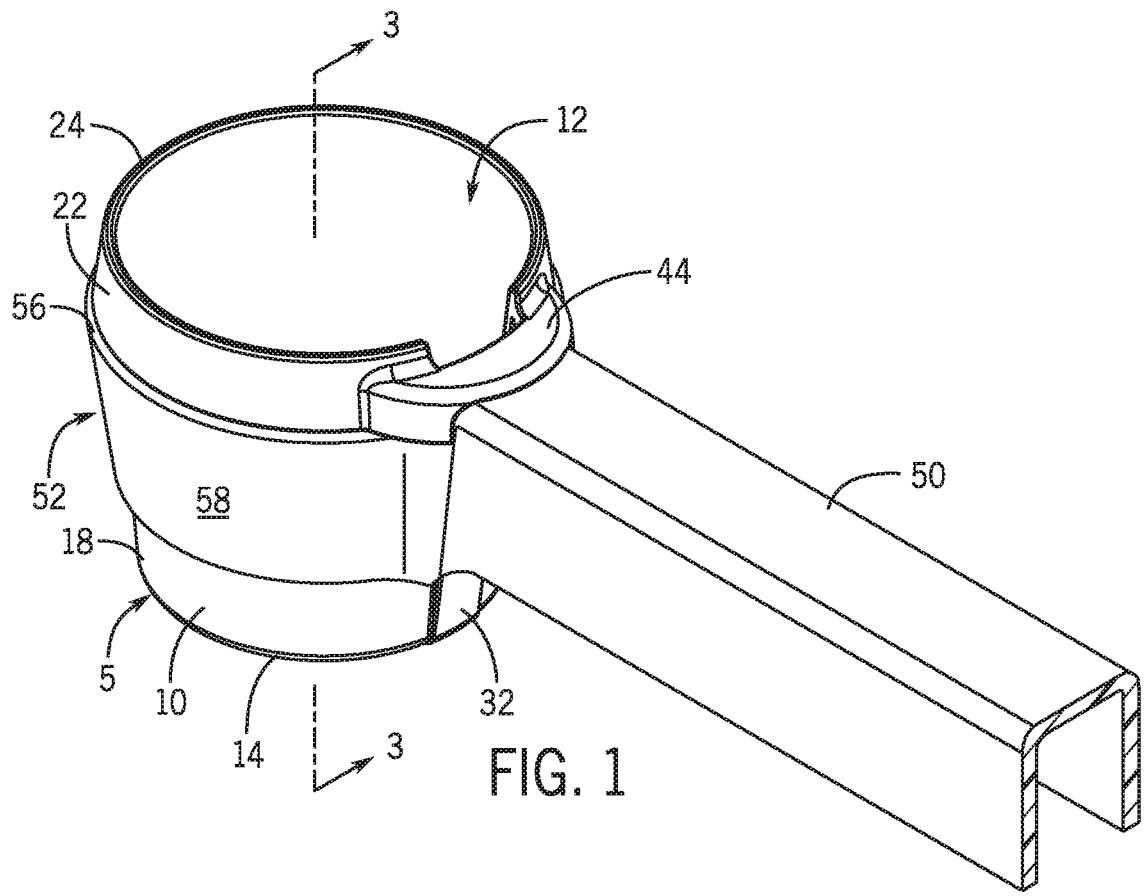
FIG. 1 is a perspective view of the cup holder insert of the present application located in an existing cup holder insert integral with an arm rest.
Figure 2:
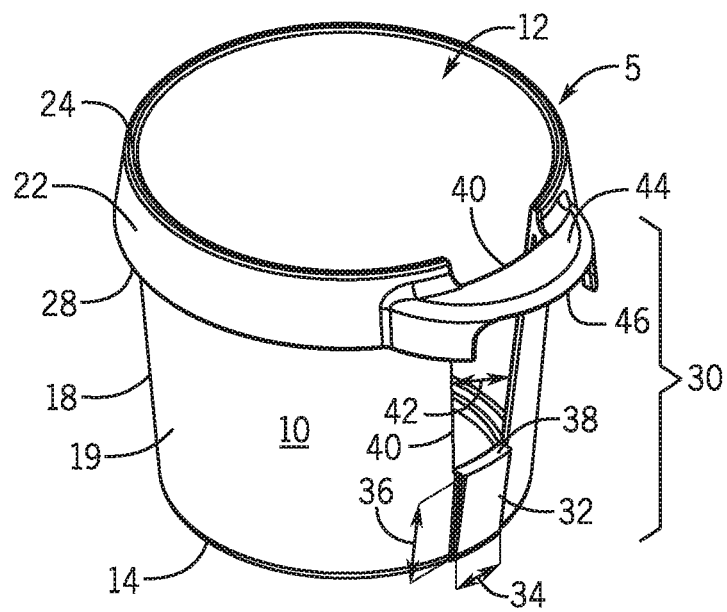
FIG. 2 is a perspective view of the cup holder insert of the present application.
Figure 3:
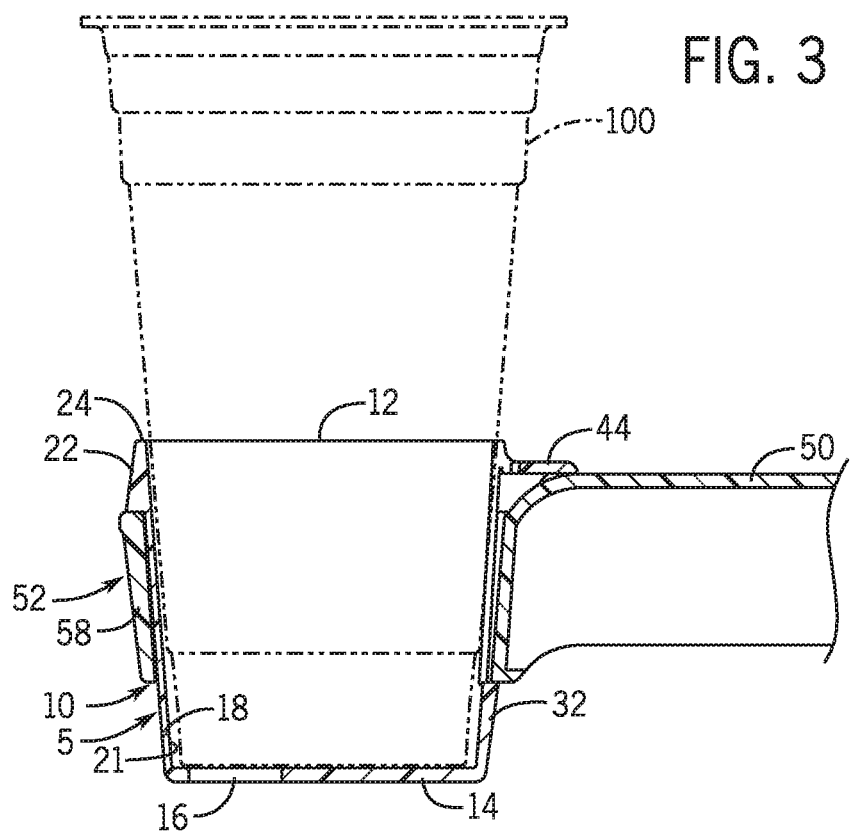
FIG. 3 is a sectional view of the cup holder insert of the present application located in an existing cup holder taken along line 3-3 of FIG. 1, and showing a cup in phantom.
Figure 4:
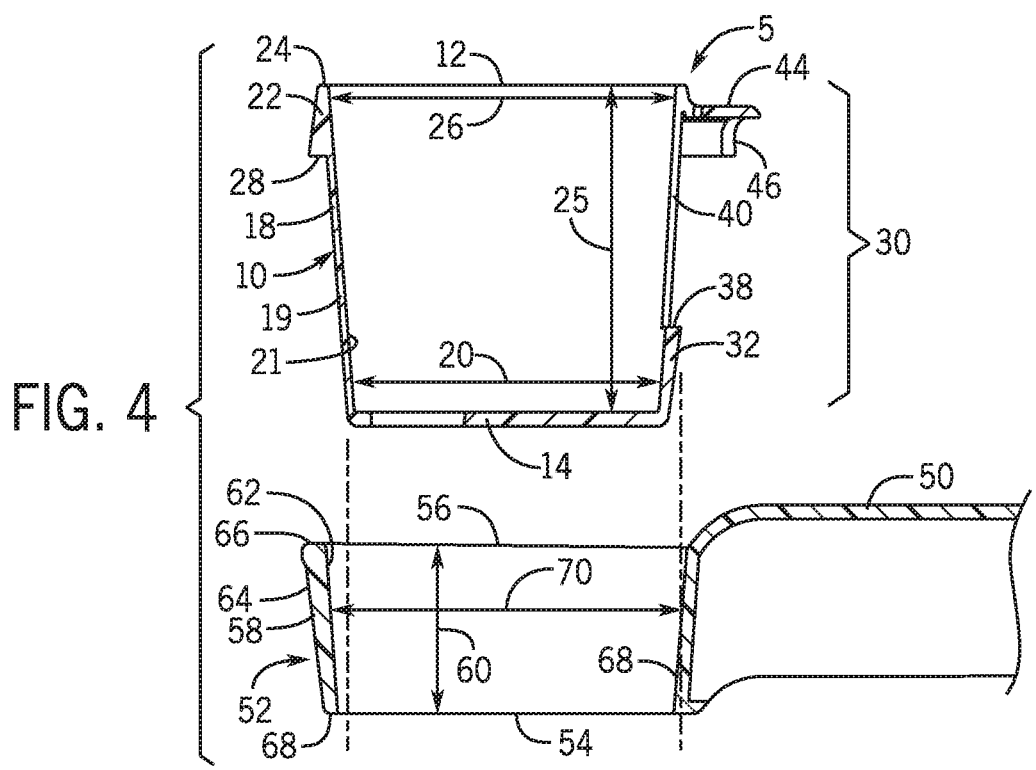
FIG. 4 is a sectional view of the cup holder insert of the present application moving into an existing cup holder.
Figure 5:
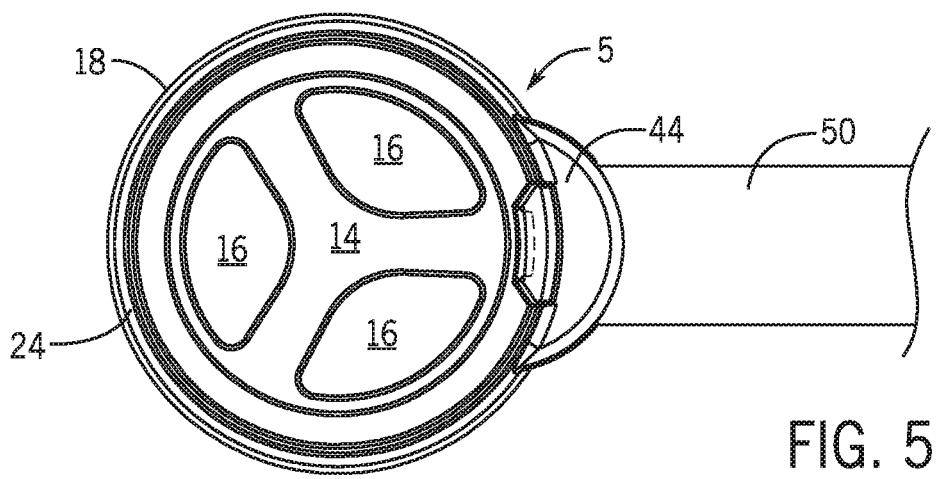
FIG. 5 is a top view of the cup holder insert of the present application located in an existing cup holder integral with an arm rest.
Figure 6:
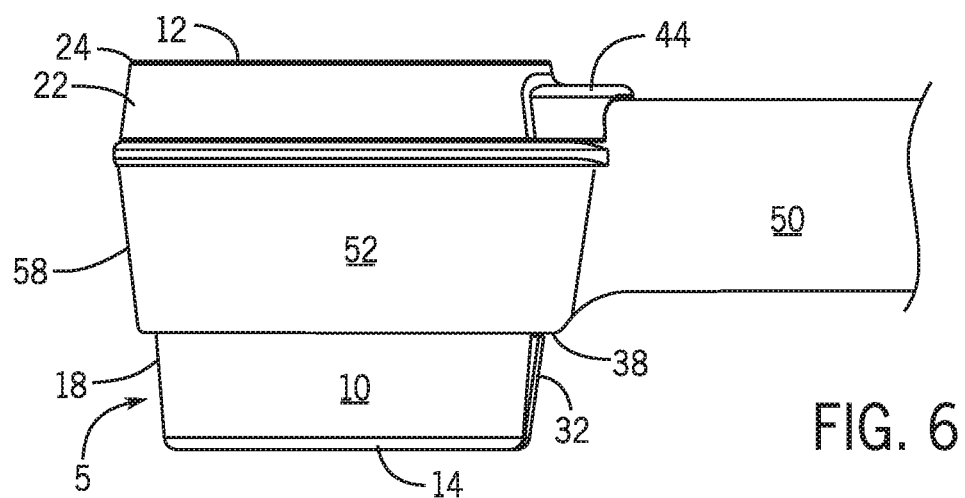
FIG. 6 is a right side view of the cup holder insert of the present application located in an existing cup holder integral with an arm rest.
Figure 7:
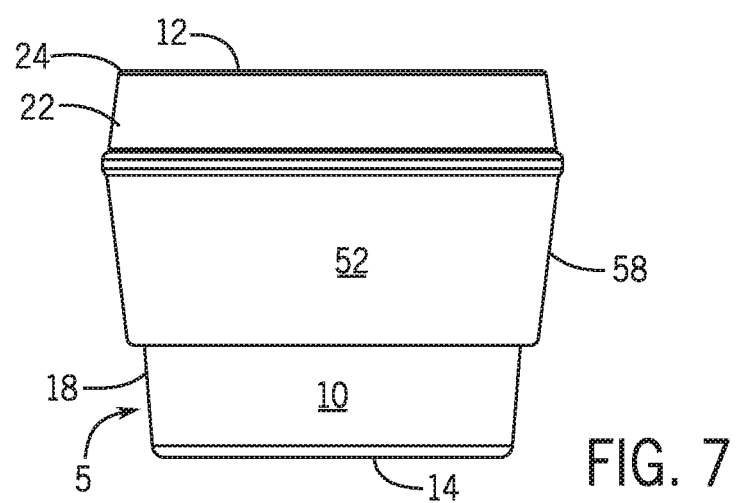
FIG. 7 is a front view of the cup holder insert of the present application located in an existing cup holder.

Turning first to FIGS. 1 and 2, the cup holder insert 5 of the present application is designed for increasing the depth of an existing cup holder 52 on an arm rest 50. The arm rest 50 is typically attached to a collapsible chair for retractable seating. The cup holder insert 5 has a generally cylindrical body 10. The generally cylindrical body has an open top 12 for receiving a cup 100 as shown in FIG. 3. The generally cylindrical body 10 of the cup holder insert 5 also has a bottom 14 for supporting the cup 100. The bottom 14 may have at least one aperture 16 extending through the bottom 14 to allow for moisture drainage as shown in FIGS. 3 and 5. The bottom 14 is spaced from and located below the open top 12. The bottom 14 is disposed in a first plane that is generally parallel with the plane of the arm rest 50. The plane that the bottom 14 and the arm rest 50 are situated in is also generally parallel with a surface that supports a seat or chair having the arm rest 50 as a component. A sidewall 18 is an inner surface 19 and an outer surface 21, as shown in FIG. 4. The inner surface 21 engages a cup 100 as shown in FIG. 3. The outer surface 19 engages an existing cup holder 52 as shown in FIGS. 3 and 4.

Referring now to FIG. 4, the sidewall 18 extends upwardly from the bottom 14 and has a sidewall diameter 20 that tapers outwardly from the bottom 14 on both the inner surface 21 and the outer surface 19. An upper lip 22 extends outwardly form the sidewall 18 and substantially surrounds the open top 12 at a terminal upper end 24 where the upper lip 22 meets the open top 12. The upper lip 22 has an outer upper lip diameter 26 tapering outwardly from the terminal upper end 24 to a support surface 28. The support surface 28 is in a substantially parallel plane to the bottom 14.

The cup holder insert 5 of the present application includes an engagement system 30 integrated into the body 10. Referring now to FIGS. 2, 3 and 4, the engagement system 30 includes a flexible lip 32 having a width 34 and a length 36 flexible lip 32 extends upwardly and outwardly from the body 10 at a location where the sidewall 18 meets the bottom 14. The length 36 terminates in an engagement surface 38 for engaging the existing cup holder 52. The engagement system 30 may include an engagement aperture 40 extending through the body 10 and the upper lip 22 at a location above the flexible lip 32 and extending to the open top 12. The engagement aperture 40 has a width 42 that is at least commensurate with the width 34 of the flexible lip 32. The engagement aperture 40 permits the flexible lip 32 to move inwardly.

The engagement system 30 may also include an alignment flange 44. The alignment flange 44 may be integral with the upper lip 22 and extend outwardly therefrom. The alignment flange 44 is typically spaced above and is vertically aligned with the flexible lip 32 and the engagement aperture 40. The alignment flange 44 spans the engagement aperture 40 along the upper lip 22. The engagement flange 44 may include a recess 46 for alignment with the arm rest 50.

The present application also contemplates a method for increasing the depth of an existing cup holder 52 and an arm rest 50. The method of the present application contemplates obtaining an arm rest 50 having an existing cup holder 52. Turning now to FIG. 4, the existing cup holder 52 has an open bottom 54 and an open top 56. The existing cup holder 52 also has a generally cylindrical sidewall 58 spanning from the bottom opening 54 of the existing cup holder 52 to the top opening 56 of the existing cup holder 52. The distance from the bottom opening 54 to the top opening 56 defines an existing cup holder depth 60. The generally cylindrical sidewall 58 of the existing cup holder 52 has an inner surface 62 and an outer surface 64. The generally cylindrical sidewall has a top end 66 defining the open top 56 and a bottom end 68 terminating in the open bottom 54. The inner surface 62 defines an existing cup holder diameter 70.

The method contemplates obtaining a cup holder insert 5 for increasing the depth of the existing cup holder 52. The cup holder insert 5 has a generally cylindrical body 10 with an open top 12, an insert bottom 14 for supporting a cup 100, with the insert bottom 14 spaced from and located below the open top 12. The bottom 14 is located in a first plane, and an insert sidewall 18 having an outer surface 19 and an inner surface 21 extends upwardly from the insert bottom 12 to define a cup holder insert depth 25. The cup holder insert depth 25 is greater than the existing cup holder depth 60. The insert sidewall 18 tapers outwardly from the bottom 14 to the top 12. The insert sidewall diameter 20 is greater than the existing cup holder diameter 70 at the top end 12 of the insert sidewall 58.

The method contemplates placing the cup holder insert 5 in the existing cup holder 52 such that the outer surface 19 of the cup holder insert sidewall 18 engages the inner surface 62 of the existing cup holder diameter 70 at a location above the cup holder insert bottom 14 and below the cup holder insert top 12.

In certain embodiments, the method includes a step of removing an existing bottom surface in the existing cup holder 52 to create the bottom openings of the existing cup holder 52 defined by the bottom end 68 of the sidewall. In certain embodiments, this step of removing the bottom surface comprises removing the bottom surface with a drill bit having a diameter that is commensurate with the diameter 70 of the existing cup holder 52 at the bottom end 68 of the sidewall 58. In other embodiments, the method contemplates removing the cup holder insert 5 from the existing cup holder 52 after use. This step of the method is typically accomplished when a chair that the arm rest 50 is attached to is to be retracted for storage.

In certain embodiments, the method of the present application contemplates that the cup holder insert body 10 includes an upper lip 22 extending outwardly from the insert sidewall 18 and substantially surrounding the open top 12 of the cup holder insert 5. The upper lip 22 may have an outer upper lip diameter 26 that is greater than the insert sidewall diameter 20. The upper lip diameter 26 tapers outwardly from a terminal upper end 24 where the upper lip 22 meets the cup insert open top 12 to a support surface 28. The support surface 28 is in a plane substantially parallel to the plane of the cup insert bottom 14. In this embodiment, the step of placing the cup holder insert 5 in the existing cup holder 52 includes engaging the support surface 28 of the cup holder insert 5 with the top surface 66 of the existing cup holder 52.

In another embodiment, the cup holder insert 5 includes a flexible lip 32 extending upwardly and outwardly from the body 18 of the cup holder insert 5 starting at the bottom 14. The flexible lip 32 terminates in an engagement surface 38 that lies in a substantially parallel plane to the bottom 14 of the cup holder insert 5. In this embodiment, the step of placing the cup holder insert 5 in the existing cup holder 52 further includes engaging the engagement surface 38 of the cup holder insert flexible lip 32 with the bottom end 68 of the sidewall 58 of the existing cup holder 52.

In another embodiment, the cup holder insert body 18 includes an engagement aperture 40 extending through the cup holder insert body 18 at a location above the flexible lip 32 to the open top 12. In this embodiment, the step of placing the cup holder insert 5 in the existing cup holder 52 further includes moving the flexible lip 32 through the existing cup holder 52 such that the flexible lip 32 flexes resiliently inwardly as the cup holder insert 5 moves along the existing cup holder diameter 70. The flexible lip 32 then returns to its original position when the flexible lip 32 has moved completely through the existing cup holder 52 so that the engagement surface 38 of the cup holder insert 5 engages with the bottom end 68 of the sidewall 58 of the existing cup holder 52.

In other embodiments, the method of the present invention contemplates that the cup holder insert 5 includes an alignment flange 44 integral with the upper lip 22 and extending outwardly therefrom. The alignment flange 44 is spaced above and vertically aligned with the flexible lip 32 and the engagement aperture 40. The alignment flange spans the engagement aperture 40 along the upper lip 22. The alignment flange 44 includes a recess 46 for alignment with the arm rest 50. In this embodiment, the step of placing the cup holder insert 5 in the existing cup holder 52 further includes engaging the recess 46 of the alignment flange 44 with the arm rest 50. This is shown in FIGS. 1, 3, 5 and 6.

As shown in FIG. 4, the arm rest 50 has an existing cup holder 52 that may be formed integrally with the arm rest 50 and located at a terminal end of the arm rest 50. The inner diameter 70 of the existing arm rest 52 tapers inwardly from the top 56 to the bottom 54 and in certain embodiments, the sidewall 18 of the cup holder insert 5 likewise tapers inwardly from the top 12 to the bottom 14. In this instance, a substantial portion of the outer surface 19 of the sidewall 18 engages the inner surface 62 of the existing cup holder sidewall 58 above the bottom 14 or below the top 12 of the cup holder insert 5. In variations on this embodiment, the engagement occurs below the upper lip 22 and above the bottom 14. In still other embodiments, the engagement occurs at the support surface 28 of the upper lip 22 and above the bottom 14 of the existing cup holder 5.

In the above description, certain terms have been used for brevity, clarity, and understanding. No unnecessary limitations are to be inferred therefrom beyond the requirement of the prior art because such terms are used for descriptive purposes and are intended to be broadly construed.

What is claimed is:

1. A cup holder insert for increasing the depth of an existing cup holder comprising:
   a generally cylindrical body having an open top, a bottom for supporting a cup spaced from and located below the open top and located in a first plane, a sidewall extending upwardly from the bottom and having a sidewall diameter, and an upper lip extending outwardly from the sidewall and substantially surrounding the open top, the upper lip having an outer upper lip diameter that is greater than the sidewall diameter;
   a flexible lip extending upwardly and outwardly from the body and having an engagement surface being in a substantially parallel plane to the bottom;
   an engagement aperture extending through the body above the flexible lip; and
   an alignment flange integral with the upper lip and extending outwardly therefrom;
   wherein the bottom has at least one aperture through the bottom.

2. The cup holder insert of claim 1, wherein the outer upper lip diameter tapers outwardly from a terminal upper end to a support surface, the support surface being in a substantially parallel plane to the bottom of the cup holder insert.

3. The cup holder insert of claim 1, wherein the sidewall diameter tapers outwardly from the bottom toward the open top.

4. The cup holder insert of claim 1, wherein the engagement aperture has a width at least commensurate with the width of the flexible lip.

5. The cup holder insert of claim 1, wherein the engagement aperture permits the flexible lip to move inwardly.

6. The cup holder of claim 1, wherein the engagement aperture extends through the outer upper lip.

7. The cup holder of claim 6, wherein the alignment flange spans the engagement aperture along the upper lip.

8. The cup holder insert of claim 1, wherein the alignment flange includes a recess for alignment with an armrest carrying an existing cup holder located on a retractable chair supported on a surface.

9. A cup holder insert for increasing the depth of an existing cup holder on an armrest located on a retractable chair supported on a surface, the cup holder insert comprising:
   a generally cylindrical body, the generally cylindrical body having an open top, a bottom for supporting a cup with at least one aperture through bottom, the bottom spaced from and located below the open top and located in a first plane generally parallel with the surface supporting the chair, a sidewall having an inner surface and an outer surface, the sidewall extending upwardly from the bottom and having a sidewall diameter that tapers outwardly from the bottom, and an upper lip extending outwardly from the sidewall and substantially surrounding the open top at a terminal upper end where the upper lip meets the open top, the upper lip having an outer upper lip diameter that is greater than the sidewall diameter, the outer upper lip diameter tapering outwardly from the terminal upper end to a support surface, the support surface being in a substantially parallel plane to the bottom;
   an engagement system is integrated into the body, the engagement system including a flexible lip having a width and a length extending upwardly and outwardly from the body at a location where the sidewall meets the bottom, the length terminating in an engagement surface for engaging an existing cup holder, an engagement aperture extending through the body and the upper lip at a location above the flexible lip to the open top, the engagement aperture having a width at least commensurate with the width of the flexible lip and permitting the flexible lip to move inwardly, and an alignment flange, the alignment flange integral with the upper lip and extending outwardly therefrom, the alignment flange being spaced above and vertically aligned with the flexible lip and the engagement aperture and spanning the engagement aperture along the upper lip, the alignment flange including a recess for alignment with the armrest.

* * * * *